No. 693,873. Patented Feb. 25, 1902.
E. LINABERRY.
COFFEE ROASTER.
(Application filed July 12, 1901.)
(No Model.)

Witnesses
D. L. Roe
R. S. Orwig.

Figure 2:
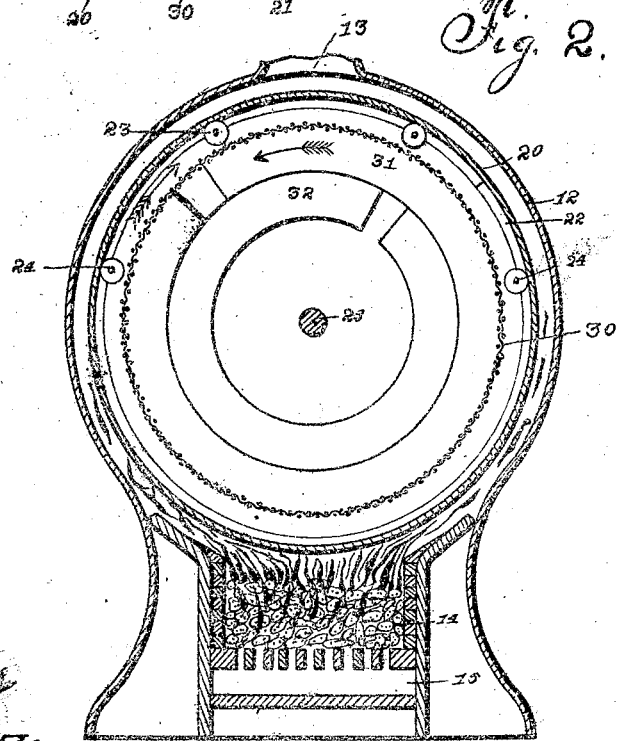

Inventor Edgar Linaberry
By Orwig & Laue, attys.

ial sectional view of the complete machine with the lower portion of the fire-box removed. Fig. 2 shows a vertical transverse sectional view of the complete machine.

UNITED STATES PATENT OFFICE.

EDGAR LINABERRY, OF DES MOINES, IOWA.

COFFEE-ROASTER.

SPECIFICATION forming part of Letters Patent No. 693,873, dated February 25, 1902.

Application filed July 12, 1901. Serial No. 68,035. (No model.)

*To all whom it may concern:*

Be it known that I, EDGAR LINABERRY, a citizen of the United States, residing at Des Moines, in the county of Polk and State of Iowa, have invented certain new and useful Improvements in Coffee-Roasters, of which the following is a specification.

Heretofore coffee-roasters have usually been provided with a housing containing a fire-box and draft-openings, together with a rotating cylinder to contain the coffee, and mounted in the housing in such a manner that the flame from the fire would strike its outer surface. In roasters of this kind it has been found that a comparatively great length of time has been required to roast the coffee thoroughly, because the heated air inside of the coffee-cylinder could not circulate freely, and it is well known that the best results are obtained by the use of heated air.

My object is to provide a machine of this class in which the coffee-containing cylinder is made of netting and arranged to rotate in one direction while a second cylinder surrounding the first, with an air-space between them, is made to rotate in an opposite direction, and said cylinder is provided with wings or ribs to force the air rapidly through the coffee, whereby the coffee is browned and roasted more rapidly by means of the heated air, and on account of this rapid browning and roasting the shrinkage in the coffee is reduced to a minimum, and, furthermore, the outer cylinder may be heated to a greater degree than would be practicable where a single cylinder is used.

My further object is to provide means whereby the air is forced rapidly through the inner cylinder and the coffee contained therein by means of an outer cylinder, and, further, to provide means whereby the waste from the coffee may be separated therefrom while the coffee is being roasted and be discharged into the fire.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
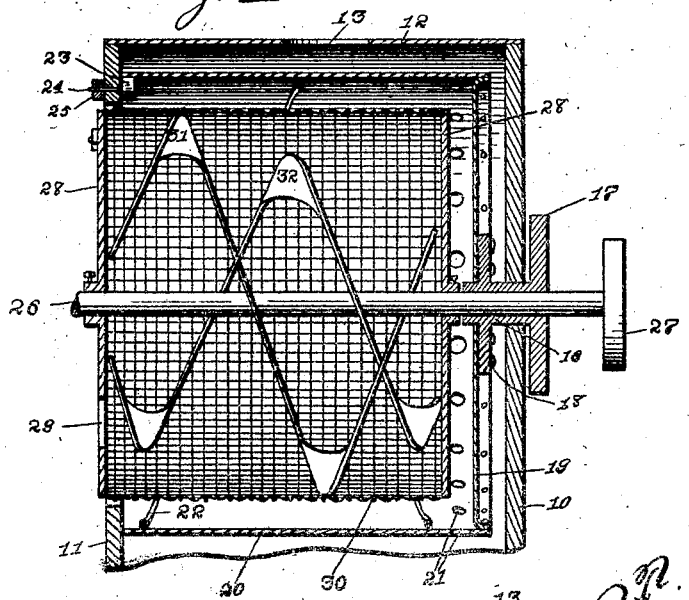

Figure 1 shows a vertical central longitudinal sectional view of the complete machine with the lower portion of the fire-box removed. Fig. 2 shows a vertical transverse sectional view of the complete machine.

Referring to the accompanying drawings, I have used the reference-numeral 10 to indicate the rear end portion of the housing and 11 the front of same, said front being open at its central portion to permit the coffee-holding cylinder to project through it. The numeral 12 indicates a sheet-metal cover secured to the ends to inclose the entire machine. At its top is an opening 13, through which the products of combustion may escape, and in the bottom of the housing is a fire-box 14, open at its top, and an ash-pit 15 below the fire-box.

The reference-numeral 16 indicates a hub rotatably mounted in the center of the end 10. On the rear end of the hub 16 is a belt-wheel 17, and on the front end thereof is an annular flange 18, to which a circular sheet-metal head 19 is fixed. Riveted to the head 19 is a sheet-metal cylinder 20, projecting forwardly to a point adjacent to the front 11. This cylinder is provided with a series of openings 21 near its rear edge, and on this inner surface is a spiral rib 22. The other edge of the cylinder 20 is supported in such a manner as to be capable of free rotation by means of the rollers 23, which rollers are fixed to the short rods 24, which pass through the front 11, and have their bearings in the boxes 25, which are formed on or fixed to the outer surface of the front 11.

It is obvious from the construction just described that a belt applied to the wheel 17 will rotate the cylinder 20 and that the spiral rib 22 will serve the double function of a fan and a screw to force substances rearwardly to the discharge-openings 21.

I have mounted in the hub 16 a shaft 26, passed through the hub and extending to the front of the machine. On the rear end of the shaft 26 is a belt-wheel 27, and fixed to the shaft are two cast-metal heads 28, the front one of said heads being provided with an opening 29, through which access may be had to the space between the heads. The said front head also project a slight distance in advance of the front 11. Fixed to the heads 28 is a cylinder 30, which is preferably made of netting formed of aluminium wire. On the interior of the cylinder 30 is a spiral rib 31, extending substantially from one end to the other, and inside of the spiral rib 31 is a second spiral rib 32, which also extends from one end to the other in an opposite direction. This form of the double spiral is now in common use in coffee-roasters and serves the function of continually moving the coffee from one end to the other.

In practical use, and assuming the parts to be arranged substantially as shown, a fire is built in the fire-box 14, and the green coffee is placed in the cylinder 30. Then power is applied to the belt-wheels 17 and 27 to turn them in opposite directions. Obviously the cylinder 20 may be heated to a comparatively greater degree, and the heated air on the inner surface of said cylinder will be constantly kept in motion by the spiral rib 22. Hence the air inside of this cylinder may be heated to a greater degree than is possible with the stationary cylinder or a cylinder not provided with a spiral rib 22. On account of the well-known fact that a body of dead air cannot be heated as quickly or as thoroughly as a body of air that is continuously kept in motion this current of heated air is rapidly forced through the screen-cylinder 30 and the coffee contained therein. Hence the coffee will be browned and roasted in a minimum of time, and the aluminium-wire netting will reduce the probability of burning the coffee to a minimum. Furthermore, the hulls and dust in the coffee will be separated therefrom and discharged into the fire, and the steam which accumulates in the outer cylinder may escape outwardly through the same openings.

Having thus described my invention, what I claim, and desire to secure by Letters Patent of the United States therefor, is—

1. An improved coffee-roaster, comprising, in combination, a housing, a rotatable cylinder mounted in the housing, and a second rotating cylinder designed to contain coffee, mounted within the first, with a space between them, and capable of rotation in a direction opposite from that of the first one.

2. An improved coffee-roaster comprising, in combination, a housing, a rotatable cylinder mounted in the housing, and a second rotating cylinder designed to contain coffee mounted within the first with a space between them and a wing or rib in the space between the cylinders.

3. An improved coffee-roaster comprising, in combination, a housing, a rotatable cylinder mounted in the housing, and a second rotating cylinder designed to contain the coffee mounted within the first with a space between them and capable of rotation in a direction opposite from that of the first one, and a spiral rib on the inner surface of the outer cylinder for the purposes stated.

4. An improved coffee-roaster comprising, in combination, a housing, a fire-box in the lower portion thereof, a rotatable hub mounted in the rear end of the housing, a belt-wheel on one end of said hub and a cylinder-head on the other end thereof, a sheet-metal cylinder fixed to said head having openings near its rear edge, rollers for supporting the forward end of the said cylinder, a hub secured to the said cylinder, a rotating shaft in said hub capable of turning relative to the hub, a belt-wheel thereon, metal cylinder-heads fixed to said shaft and a cylinder made of netting connected with said heads to operate in the manner set forth for the purposes stated.

EDGAR LINABERRY.

Witnesses:
JNO. L. MARTIN,
J. RALPH ORWIG.